May 19, 1925.
R. LA FRANCE
MEANS FOR TRANSFERRING WARE TO LEERS
Filed March 15, 1923
1,538,248
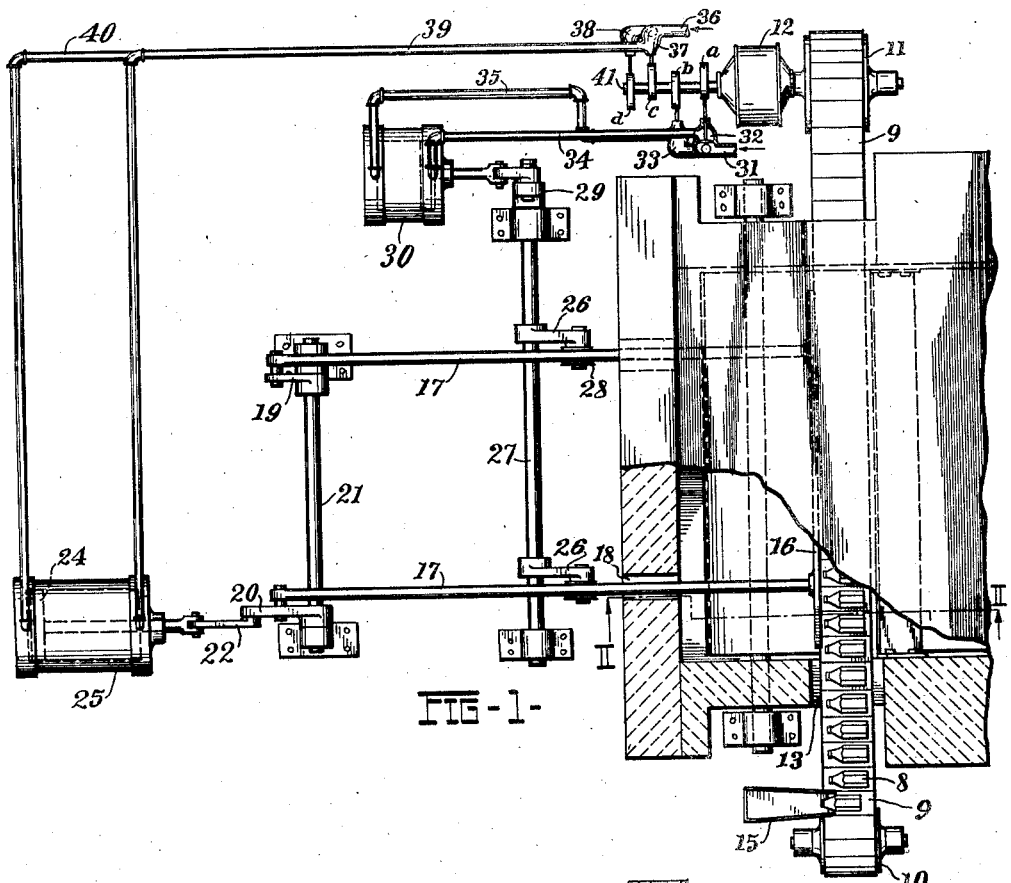
Fig-1-
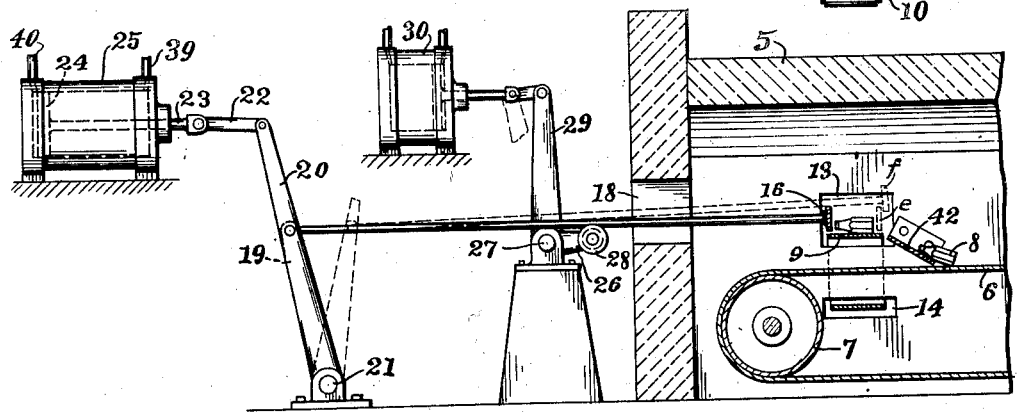
Fig-2-
INVENTOR
Richard La France
By J. F. Rule
His attorney.

Patented May 19, 1925.

1,538,248

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR TRANSFERRING WARE TO LEERS.

Application filed March 15, 1923. Serial No. 625,178.

*To all whom it may concern:*

Be it known that I, RICHARD LA FRANCE, a citizen of the United States, residing at Toledo, in the county of Lucas and State of Ohio, have invented new and useful Improvements in Means for Transferring Ware to Leers, of which the following is a specification.

My invention relates to apparatus for transferring bottles or other glass ware to an annealing oven or leer. One form of apparatus for this purpose in commercial use at the present day, comprises an endless belt or conveyor, traveling transversely through the end of the leer and on which the articles are carried within the leer. A pusher device is operated periodically to push the articles off the belt onto the usual leer conveyor. Where the bottles or other articles are rapidly supplied in this manner to the leer, difficulty is sometimes experienced on account of the bottles or other ware piling up during the operation of the pusher device or interfering with the operation of the mechanism.

An object of my invention is to overcome the above difficulty by providing means for transferring the ware from the carrying-in belt to the leer conveyor without interrupting or interfering with the continuous advance of the incoming articles.

A further aim of the invention is to provide means of this character which is simple in construction and free from mechanical complications.

Other objects of the invention will appear hereinafter.

In the accompanying drawings:

Figure 1 is a part sectional plan view of apparatus constructed in accordance with my invention.

Figure 2 is a sectional elevation at the line II—II on Figure 1.

The annealing oven or leer 5 is provided with the usual leer conveyor 6 which runs on rolls 7 and by which bottles 8 or other glass articles are carried slowly through the leer. The endless carrying-in belt or conveyor 9 extends transversely through the leer adjacent the receiving end of the leer, said belt being mounted on pulleys 10 and 11, the latter driven by a continuously running motor 12. The upper and lower leads of the belt 9 extend respectively through openings 13 and 14 in the side walls of the leer. The bottles 8, or other articles to be annealed, are delivered to a chute 15 from which they slide onto the continuously traveling belt 9 at a point outside of the leer and are carried by the belt into the leer.

A transfer device or pusher for transferring the bottles to the leer conveyor, comprises a pusher bar 16 within the leer extending lengthwise of the belt 9. The pusher bar is carried by rods 17 extending rearwardly through openings 18 in the end wall of the leer and connected at their rear ends to rock arms 19 and 20, fixed to and projecting upwardly from a rock shaft 21. The rock arm 20 extends upwardly beyond the rods 17 and is connected through a link 22 to the piston rod 23 and piston 24 of an air motor 25.

The pusher rods 17 are supported intermediate their ends on grooved pulleys 28 carried on rock arms 26, fixed to a rock shaft 27. An arm 29 fixed to and extending upwardly from the rock shaft 27 is connected at its upper end to air motor 30. The motor 30 is operated by air under pressure supplied through a pipe 31. Valves 32 and 33 control the supply of air from the pipe 31 to pipes 34 and 35 respectively, leading to opposite ends of the motor 30. The motor 25 is also operated by air under pressure, supplied through a pipe 36. Valves 37 and 38 control the supply to pipes 39 and 40, leading respectively to the ends of the motor 25. Cams $a$, $b$, $c$ and $d$ on the shaft 41 of the motor 12 respectively control the valves 32, 33, 37 and 38.

The operation is as follows: The bottles or other articles 8 are delivered in rapid succession to the continuously running carrying-in belt 9, so that a continuous row of such articles is being carried into the leer. The continuously running motor 12 which drives the carrying-in belt also operates the cams $c$ and $d$, thereby opening the valves 37 and 38 alternately for operating the motor 25. When the valve 38 is opened, air under pressure is admitted behind the piston 24, so that the motor operates through the rock arms 20, 19, and rock shaft 21 to move the pusher rods 17 and pusher bar or wiper 16 forward, thereby pushing or wiping a row of bottles off the belt 9 onto an inclined platform 42, down which they slide onto the leer conveyor 6. During this forward movement of the pusher bar, the pulleys 28 are in their lowered position (Fig. 2). As the pusher bar completes, or is completing, its forward movement, the motor 30 is brought into operation to lift said bar from the broken line position e (Fig. 2) to the broken line position f. This operation of the motor 30 is effected by means of the cam a opening the valve 32 and admitting air to the forward end of the motor. As soon as the pusher bar reaches the elevated position f, the valve 37 operates to supply air to the forward end of the motor 25 so that the latter operates to retract the pusher bar while it is held in its elevated position. The valve b now operates to supply air to the motor 30 for moving the rock arm 29 forward and lowering the pulleys 28, so that the pusher rods are lowered to their initial position.

It will be observed that the pusher bar 16 when in its forward position, is beyond the path of the incoming row of bottles, so that it does not interfere with the continuous advance of the bottles. Also, as the pusher bar is held elevated above the path of the bottles while the bar is being retracted, there is no interference at this time. It is to be noted further that the pusher rods 17, after their forward movement, are lifted above the path of the bottles before there is opportunity for any interference with the incoming bottles. Moreover, the forward movement of the pusher bar takes place with sufficient rapidity to prevent any substantial interference with, or interruption of, the movement of the bottles into the leer.

Modifications may be resorted to within the spirit and scope of my invention.

What I claim is:

1. The combination of a horizontally traveling conveyor, a pusher extending lengthwise thereof, a motor having connections with said pusher and operable to move it back and forth over the conveyor, a second motor, connections between said second motor and the pusher for lifting and lowering the pusher, and controlling mechanism operable to effect periodic operations of the motors in a predetermined time relation.

2. The combination of a horizontally traveling conveyor, a pusher extending lengthwise thereof, a motor having connections with said pusher and operable to move it back and forth over the conveyor, a second motor, connections between said second motor and the pusher for lifting and lowering the pusher, valves controlling the motors, and means for actuating the valves in such timed relation that the pusher is first moved forward, then lifted, then retracted and then lowered.

3. The combination of a leer, an endless belt conveyor extending transversely through the leer, a continuously running motor to drive said belt, a pusher bar extending lengthwise of the conveyor, means comprising motors for moving the pusher back and forth and for lifting and lowering it, valves controlling said last mentioned motors and thereby controlling said movements of the pusher, and cams operated by said first mentioned motor for controlling the valves.

4. The combination of a leer, a conveyor extending transversely through the leer, a pusher bar extending lengthwise of the conveyor, rods carrying said bar and extending rearwardly therefrom, a rock shaft, rock arms extending upwardly from the rock shaft and connected to the rear ends of said rods, a motor having connections for rocking said shaft and thereby moving said rods and pusher bar forwardly and rearwardly, a second motor, operating connections between said second motor and said rods for swinging the latter up and down about their points of connection with said rock arms and thereby lifting and lowering the pusher bar, and automatic means for effecting periodic operations of said motors in a predetermined time relation such that said bar is periodically moved forward over the conveyor, lifted, moved rearwardly and then lowered.

Signed at Toledo, in the county of Lucas and State of Ohio, this 10th day of March, 1923.

RICHARD LA FRANCE.